United States Patent [19]

Goritz et al.

[11] Patent Number: 4,561,700
[45] Date of Patent: Dec. 31, 1985

[54] SELECTOR VALVE FOR A PRESSURE CONTROL DEVICE IN A RAILWAY VEHICLE AIR BRAKE SYSTEM

[75] Inventors: Bernd Goritz, Lohhof; Johann Hüber, Munich; Peter Meinicke, Gauting, all of Fed. Rep. of Germany

[73] Assignee: Knorr-Bremse GmbH, Munich, Fed. Rep. of Germany

[21] Appl. No.: 636,984

[22] Filed: Aug. 2, 1984

[30] Foreign Application Priority Data

Aug. 2, 1983 [DE] Fed. Rep. of Germany ....... 3327903

[51] Int. Cl.$^4$ ............................................. B60T 15/22
[52] U.S. Cl. .................................................... 303/36
[58] Field of Search ....................... 303/33, 35, 36, 68, 303/70, 80-83

[56] References Cited

U.S. PATENT DOCUMENTS 3,554,615  1/1971  Worbois et al. ...................... 303/36

*Primary Examiner*—Duane A. Reger
*Attorney, Agent, or Firm*—Edmund M. Jaskiewicz

[57] ABSTRACT

A pressure control valve for the compressed air brakes of a railway vehicle includes a triple pressure control valve with a constant pressure chamber, a selector valve and a selector reservoir. Upon the occurrence of pressure reductions in the main brake line for service braking, the selector valve selector remains at rest. When stronger pressure reductions in the main brake line occur, the selector valve evacuates the selector reservoir which lags in relation to the main brake line pressure as result of the force exerted by a pre-stressed spring until a specific minimum pressure is attained by a retention valve. In a subsequent brake release, the selector valve will produce a pressure balance between the constant pressure chamber and the selector reservoir to facilitate the brake release process and a balancing or proportioning of the pressure control valve at an optionally reduced normal pressure head in the main brake line. The selector valve includes a piston retained in a middle position by a spring buffer and by two valves positioned on both sides of the piston and spring loaded in their respective closing directions. On one side, the piston is loaded by the main brake line pressure and on the other side by the pressure in the selector reservoir.

5 Claims, 1 Drawing Figure

U.S. Patent  Dec. 31, 1985  4,561,700
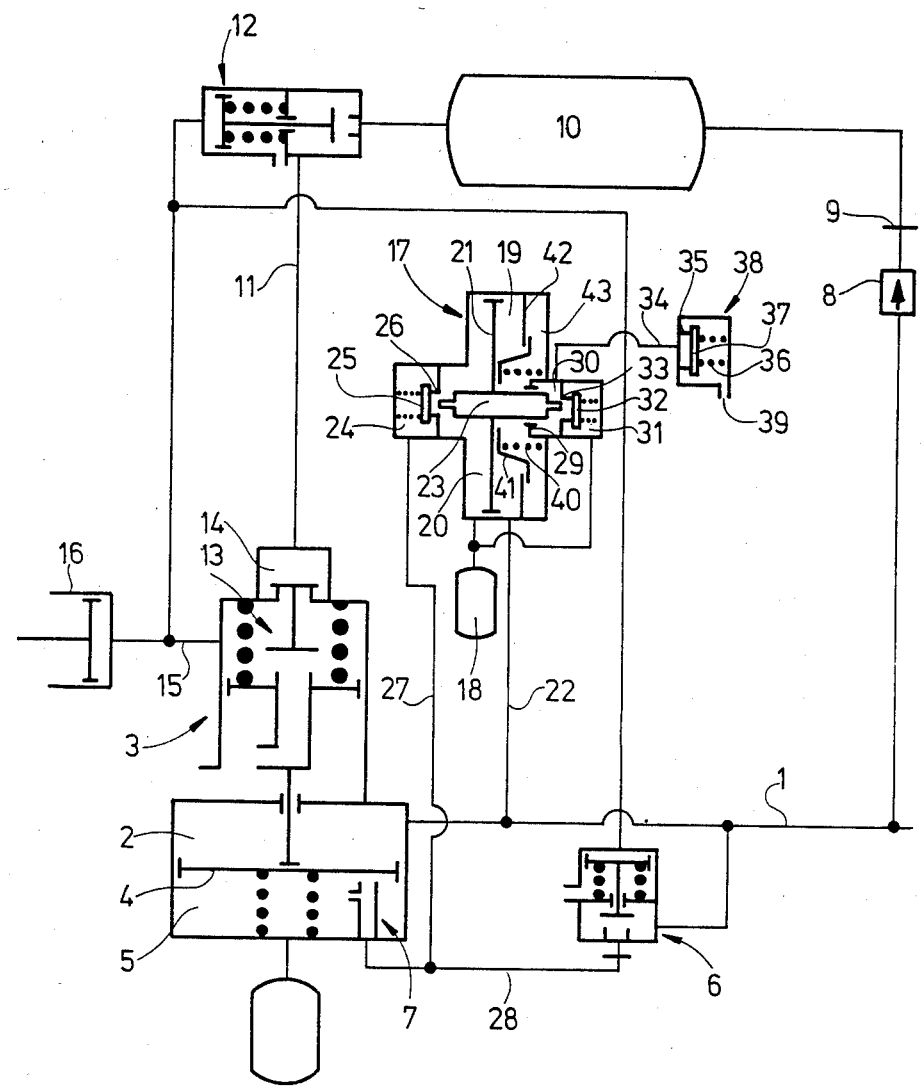

SELECTOR VALVE FOR A PRESSURE CONTROL DEVICE IN A RAILWAY VEHICLE AIR BRAKE SYSTEM

The present invention relates to a pressure control valve for the air brake system of a railway vehicle, more particularly, to a selector device having a selector reservoir and selector valve in conjunction with said pressure control device.

There is disclosed in the U.S. Pat. No. 3,554,615 a pressure control valve for a compressed air brake system of a railway vehicle which further includes a triple pressure control valve for control of the brake cylinder load and having a piston system loaded by the pressures in a main brake line, in a constant pressure reservoir and in the brake cylinder. There is also a selector device which includes a selector reservoir and a selector valve. The selector valve includes a piston loaded by the pressure in the main brake line against the pressure in the selector reservoir. Operatively associated with the piston is a buffer device having a pre-tensioned spring and a valve that can be switched by the piston. The valve has three switching or operating positions for filling the selector reservoir from the constant pressure reservoir of the triple pressure control valve, for shutting off the selector reservoir and for emptying of the selector reservoir.

After adjustment to a position following a braking application wherein there is now a pressure in the main brake line which is below the pressure head used for a full service braking application, there is now carried out an adjusting process wherein there is a balancing of pressure between the constant pressure chamber and the selector reservoir which has at least been partially emptied. This adjusting process adapts or proportions the pressure control valve to reduced normal pressure heads in the main brake line such as would occur, for example, in changing from one locomotive to another or a passenger-freight changeover involving the railway vehicle having the pressure control valve. The pressure in the constant pressure reservoir is sufficiently reduced by this pressure balancing to obtain a complete brake release even at the reduced normal fully charged pressure in the main brake line and is able to bring about an adjusting of pressure in the constant pressure reservoir at the new reduced normal pressure head in the main brake line.

The valve structure of this known selector valve comprises a complicated slide valve which includes many sealing locations, has friction ratios and switching hysteresis which can only be very inadequately controlled and requires a relatively high cost of construction and maintainence. In the chamber subjected to the main brake line pressure for loading the piston, there is a buffer device which includes a pre-tensioned spring one side of which rests directly on the piston and the other side is supported by a spring plate held on the piston by a stop in the direction of support of the piston. The spring plate is moveable to a stop on a wall of the body of the selector valve in the middle position of the piston. This known selector device operates at every service or full service braking. In such operation, at the beginning of a braking application the selector reservoir is vented to the brake cylinder and the selector reservoir is then cut off. In a brake release the selector device performs a renewed charging of the selector reservoir to the normal pressure head. As a result, in addition to the frequent operating of the selector valve which causes wear, there is an unnecessary consumption of compressed air and energy and upon brake release, recharging of the compressed air brake to a full normal pressure head is delayed. During an emergency braking application or in setting a post braking range with a relatively low main brake line pressure, the selector reservoir is connected with the brake system air reservoir and thereby has its pressure reduced relatively great. Upon a subsequent brake release, there is a pressure balancing between the constant pressure chamber and a post braking reservoir such that a considerable pressure reduction occurs in the constant pressure chamber. If several emergency brake applications or post braking adjustments quickly follow one another, the pressure in the brake system air reservoir can drop a relatively great magnitude whereby subsequently balancing pressure heads which are constantly further dropping also result in the constant pressure chamber. Accordingly, there is a real danger of depletion of the pressure control valve in which the pressure in the constant pressure chamber is so low that full service braking can no longer be obtained. Also, in the known pressure control device the selector valve is held in its desired position in one of the end positions of the piston only by friction of the slide valve member. This is disadvantageous since the selector valve can unintentionally move from this end position to a middle position of the piston by driving strokes whereby undesired switching operations or procedures may be initiated.

In DE-A No. 2,004,310 there is disclosed a brake control system with variations from those features discussed above. In this brake control system the constant pressure chamber is connected with the selector reservoir at the beginning of a braking application as a function of the charging of an accelerating reservoir to be filled from the main brake line by a special valve. As a result, a pressure reduction in the constant pressure chamber is already produced at the beginning of the braking application. In the usual air brake system there may thus be caused a shift of the brake step or increment adjustment and, accordingly, a disturbance of the coordination or relationship of the various components of the brake control system.

It is therefore the principal object of the present invention to provide such a brake control device for air brakes of a railway vehicle having a novel and improved selector valve device.

It is another object of the present invention to provide such a control device having a simple and effective structure so as to achieve a reliable adjusting or proportioning in the so-called post braking position without unnecessary consumption of compressed air and without making more difficult the recharging of the air brakes when the brakes are released.

It is a further object of the present invention to provide such a pressure control valve which eliminates unnecessary switching strokes and unnecessary wear so as to achieve long and maintainence-free operating periods.

It is an addition object of the present invention to provide such a pressure control device having the possiblity to exclude any danger of exhaustion for the compressed air brake system to maintain the selector device, which cannot be unintentionally adjusted by driving strokes secure in its desired and predetermined position in a state of rest.

The objects of the present invention are achieved and the disadvantages of the prior art are eliminated by the device of the present invention which has two valves the first of which opens the valve monitoring the filling of the selector reservoir in the case of a deflection of the piston under a dominant load from the main brake line pressure from a middle position in one direction of stroke, and a second valve which opens the valve monitoring the emptying of the selector reservoir into the atmosphere in the case of deflection of the piston under a dominant load from the pressure of the selector reservoir from the middle position in the opposite direction of stroke. The device is also provided with a buffer which loads the piston only in the return position from the initial position for the second valve to the middle position.

According to one aspect of the present invention a pressure control device for the air brake system of a railway vehicle may comprise a triple pressure control valve and piston means in the triple pressure control valve connected to a main brake line, a constant pressure chamber and to a brake cylinder such that the piston means is subjected to the respective pressures. There is a selector device having a selector valve which includes a piston one side of which is connected to the main brake line and the other side is connected to a selector reservoir. In the selector valve there are first and second valves which have three operating positions including a middle position. These positions are for filling the selector reservoir from the constant pressure chamber, for shutting off the selector reservoir and for emptying the selector reservoir. The first valve is opened by the selector valve piston under a dominant load from the main brake line in one direction of stroke from its middle position. The second valve is actuated by a dominant load from the selector reservoir from its middle position in the opposite direction of stroke to an open position in which the selector reservoir is emptied into the atmosphere. Buffer means including a pre-tensioned spring urged the selector valve piston back to its middle position and thus closes the second valve such that the evacuation of air from the selector reservoir is interrupted.

Other objects and advantages of the present invention will be apparent upon reference to the accompanying description when taken in conjunction with the following drawings, which are exemplary, wherein the single drawing is a diagramatic representation of the pressure control device of the present invention and associated elements of the air brake system.

Proceeding next to the drawings wherein like reference symbols indicate the same parts throughout the various views a specific embodiment and modifications of the present invention will be described in detail.

The main brake pipeline 1 is connected to a control chamber 2 of a triple pressure control valve 3. The control chamber 2 is separated by a control piston 4 from a constant pressure chamber 5 which can be filled from the main brake line 1 through a monitoring valve 6 which closes during a braking application and a filling stroke device 7. The main brake line 1 is connected through a check valve 8 and a throttling nozzle 9 to a brake air storage reservoir 10. A pipeline 11 which leads from the reservoir 10 has connected therein a maximum pressure control valve 12 which in turn is connected through the pipeline 11 to a supply chamber 14 which is positioned directly ahead of a valve device 13 in the triple pressure control valve 3. The triple pressure control valve 3 is connected through a pipeline 15 to a brake cylinder 16, to the maximum pressure control valve 12 and to the monitoring valve 6.

Up to this point, the construction and mode of operation of the pressure control valve corresponds to that disclosed in DE-C No. 1,021,878 and therefore need not be described in greater detail.

A selector valve indicated generally at 17 and a selector reservoir 18 are provided which together form a selector device 17, 18. The selector or balancing valve 17 has two chambers 19 and 20 which are separated from each other by a piston 21. The chamber 19 which in the drawing is at the right of piston 21 is connected by a pipeline 22 to the main brake line 1 and chamber 20 on the other side of piston 21 is permanently connected to the selector reservoir 18.

The piston 21 is mounted upon a valve stem 23 that extends on both sides of the piston. In chamber 20, the valve stem 23 terminates before a spring-loaded valve member 25 which is located in a chamber 24. The valve member 25 is engagable with a valve seat 26 constructed integrally with the body of the selector valve device 17 to form a lift or push valve 25, 26 that is spring loaded in the closing direction and which monitors a communication between chambers 24 and 20. The chamber 24 is connected by a pipeline 27 with a pipeline section 28 extending between the monitoring valve 6 and the filling stroke protective device 7. The chamber 24 is thus connected through the protective device 7 with the constant pressure chamber 9 of the triple pressure control valve 3.

The portion of the valve stem 23 in chamber 19 sealingly and slideably passes through a partition wall 29 and terminates in a chamber 30 immediately before a valve member 32 located in a chamber 31. The valve member 32 is spring loaded and is engagable with a valve seat 33 formed integrally with the body of the selector valve 17 and thus forms a push or lift valve 32, 33 that is spring loaded in the closing directions and monitors communication between chambers 30 and 31.

The chamber 31 is permanently connected to the selector reservoir 18 and a pipeline 34 connects the chamber 30 with a retention valve 38 constructed as a spring loaded check valve having a valve member 37 pressed against valve seat 35 by a spring 36. The retention valve 38 has an opening 39 to the atmosphere so as to provide that the pipeline 34 can be opened to the atmosphere through valve 36,37 and opening 39. The pipeline 34 thus can communicate with a chamber in the retention valve 38 surrounded by valve seat 35.

In the chamber 19 of the selector valve 17 is a spring 40 an end of which away from the piston 21 is supported solidly with the body of the selector valve 17 and the other end of the spring 40 directed toward the piston 21 is engagable with a spring plate 41 through which passes the valve stem 23 with clearance. The spring plate 41 is bent at substantially a right angle so as to define a flange engagable with an annular stop ring 42 constructed integrally with the body of the selector valve 17. The flange thus defines a stop 43 which can support the spring plate 41 in the direction of movement to the piston 21 under the action of the pre-tensioned spring 40.

In the rest position as illustrated in the drawing, the piston 21 is in a middle position in which position both valves 25, 26 and 32,33 are closed and the spring plate 41 under the force exerted by spring 40 is positioned a short distance or space in front of the piston 41.

With the brake released and the main brake line 1 charged to its normal pressure head, a like normal pressure head will also exist in chamber 19 through line 22 and because of a temporary opening of valve 25, 26 also in the chamber 20. Upon occurrence of a reduction in pressure in the main brake line 1 to a specific medium pressure head such as would be necessary for performing service braking and full service braking, the pressure in chamber 19 will drop concurrently with the drop in the main line pressure 1 such that a force directed toward the right as viewed in the drawing acts upon piston 21 because of the normal pressure head remaining in chamber 20. This force will position piston 21 in contact with spring plate 41 but is insufficient to compress initially the stressed spring 40. Thus, piston 21 remains at least almost at its rest position and both valves 25, 26 and 32, 32 remain closed. The pressure prevailing in chamber 20 and in selector reservoir 18 thus remains at normal pressure head during service and full service braking applications. As a result, compressed air is not unnecessarily consumed and in the subsequent brake release upon recharging of main brake line 1 and chamber 19 to the normal pressure head it is not necessary to recharge the chamber that previously was emptied unnecessarily. Release can then occur without being hindered by unnecessary charging procedures.

If the pressure in the main brake line 1 is reduced below the above mentioned medium pressure head as would occur in adjusting to a post braking range or during an emergency braking application, the pressure differential acting on piston 21 is sufficient to shift piston 21 to the right and carry along spring plate 41 together with a release of the stop 43 and compression of the spring 40. As a result, the end of stem 23 will engage the valve member 32 which will then be lifted against its spring load from valve seat 33. With the valve 32, 33 now open, compressed air will escape from the selector reservoir 18 and chamber 20 through chamber 31, open valve 32, 33, chamber 30 and pipe 34 into the chamber in retention valve 33 surrounded by the valve seat 35 such that a pressure now builds under valve 37 to lift the valve member 37 from valve seat 35 against the force of spring 36 and enables the compressed air to escape through opening 39 to the atmosphere. This escape of compresses air produces a pressure reduction in selector reservoir 18 and in chamber 30. As result of this pressure reduction, the differential pressure acting on piston 21 is decreased to the extent that with main brake line not completely emptied, the pressure still existing in chamber 19 assisted by the force of spring 40 is sufficient to shift piston 21 to its illustrated middle position with the closing of valve 32,33. As a result, the escape of compressed air from selector reservoir 18 and chamber 20 through opening 19 to the atmosphere is interrupted.

The reclosing of valve 32, 33 and the pressure head of the remaining residual pressure in selector reservoir 18 and in chamber 20 is dependent on the pressure head prevailing in main brake line 1. This pressure head in the post braking pressure range is between the aforementioned medium pressure head and atmoshperic pressure. Upon a complete emptying of main brake line 1, the pressure prevailing in adjusting reservoir 18 with open valve 32, 33 decreases until spring 36 can again press valve member 37 on valve seat 35 and the pressure existing in the chamber surrounded by valve seat 35 and therefore existing in selector reservoir 18 is no longer sufficient to lift the valve member 37 from valve seat 35. With continued opening of valve 32, 33, the evacuation of selector reservoir 18 is interrupted and a predetermined, fixed residual pressure head will remain in this reservoir.

Upon a subsequent recharging of the main brake line 1, chamber 19 through pipeline 22 will also be recharged. The differential pressure on piston 21 is now decreased and the valve 32, 33 which is possibly still open is closed by the return movement of piston 21 to its middle position as illustrated. After a pressure balance has been achieved between chambers 19 and 20, a reverse differential pressure will begin to build up with a dominant pressure in chamber 19 acting on piston 21. This differential pressure is almost immediately able to shift piston 21 to the left which in turn opens valve 25, 26 and compressed air will escape from constant pressure chamber 5 through the filling stroke device 7, pipe section 28, pipe 27, chamber 24 and opened valve 25, 26 into chamber 20 and into the balancing reservoir 18 until a pressure balance is attained between constant pressure chamber 5 and the reservoir 18. This pressure balance is considerably less than the normal pressure head by a considerable value.

In the meantime, main brake line 1 and chamber 19 are also charged to at least this balancing pressure head. With a further increase in pressure in main brake line 1, control piston 4 of the triple pressure control valve 3 will be pressed downwardly against the reduced pressure in constant pressure chamber 5 whereupon the triple pressure control valve 3 will reach its release position and evacuate the previously pressure-loaded brake cylinder 16. When the release condition is reached, the monitoring valve 6 which was previously closed during the braking application now opens. Constant pressure chamber 5 and with the continued opening of valve 25, 26, also chamber 20 and selector reservoir 18 are charged with compressed air through main brake line 1. This charging process will continue until a normal pressure head which is appropriate for the release brake is attained in the main brake line 1. This normal pressure head may deviate from the normal pressure head prevailing before the described post braking or emergency braking application. In particular, this normal pressure head may be considerably lower than the previously existing normal pressure head. When the normal pressure head is attained in the constant pressure chamber 5, in chamber 20 and in the selector reservoir 18, the differential pressure existing on piston 21 now fades away and the spring loaded valve 25 can now close valve 25,26 while at the same time pushing back piston 21 to the middle position as illustrated to complete the release and balancing process.

It is essential that the selector valve 17 remain at rest during service and full service brake applications and begin to operate only in the case of post braking service or emergency brake application. In the rest position of selector valve 17 both valves 25, 26 and 32, 33 are securely closed under their respective spring loads and piston 21 is retained in its illustrated middle position by these valves and the force of retention spring 40. As a result, no undesired switching processes can be triggered by any shocks, impacts or other unexpected forces acting upon the selector valve device.

Retention valve 33 assures the existence of a sufficient minimum pressure head in the selector reservoir 18 for post braking applications and for emergency applications. Thus, in the subsequent pressure balancing with constant pressure chamber 5 the pressure will not drop below a predetermined minimum and the brake cannot be exhausted by too great a pressure reduction in the constant pressure chamber 5 even if several post braking operations or emergency braking applications should quickly follow each other. It is to be understood that the pressure control valve can be constructed integrally with or separate from other devices which might be used including but not limited to, for example, a load-responsive relay valve, a pressure-freight change-over apparatus or the like. Thus it can be seen that the present invention has disclosed a pressure control valve for the compressed air brakes of a railway vehicle and which includes a triple pressure control valve with a constant pressure chamber, a selector valve and a selector reservoir. Upon the occurence of pressure reductions in the main brake line for achieving only service braking, the selector valve 17 remains at rest. When stronger pressure reductions in the main brake line occur reaching the post braking range or causing emergency brake applications the selector valve begins to function by evacuating the selector reservoir 18 which lags in relation to the main brake line pressure as result of the force exerted by a pre-stressed spring until a specific minimum pressure is attained by retention valve 38. In a subsequent brake release, the selector valve will produce a pressure balance between the constant pressure chamber and the selector reservoir so as to facilitate the brake release process and a balancing or proportioning of the pressure control valve at an optionally reduced normal pressure head in the main brake line. The selector valve 17 includes a piston retained in a middle position by a spring buffer and by two valves positioned on both sides of the piston and spring loaded in their respective closing directions. On one side, the piston is loaded by the main brake line pressure and on the other side by the pressure in the selector reservoir. The spring buffer impedes a deflection of the piston in the direction of the valve which monitors an evacuation of the selector reservoir.

It will be understood that this invention is susceptible to modification in order to adapt it to different usages and conditions, and, accordingly, it is desired to comprehend such modifications within the scope of the appended claims.

What is claimed is:

1. A pressure control device for air brakes for a railway vehicle comprising a triple pressure control valve having a constant pressure chamber, piston means in said triple pressure control valve connected to a main brake line, to said constant pressure chamber and to a brake cylinder such that said piston means is subjected to the respective pressures therein, a selector device comprising a selector reservoir and a selector valve, said selector valve having a piston one side of which is connected to the main brake line and another side of which is connected to said selector reservoir, valve means in said selector valve and having three operating positions including a middle position for filling the selector reservoir from the constant pressure chamber, for shutting off the selector reservoir and for emptying said selector reservoir, said valve means comprising first and second valves, said first valve adapted to be opened by said selector valve piston under a dominant load from the main brake line in one direction of stroke from its middle position, said second valve actuated by a dominant load from said selector reservoir from its middle position in the opposite direction of stroke to an open position in which the selector reservoir is emptied into the atmosphere, and buffer means including a pre-tensioned spring for urging said selector valve piston back to its middle position and to close said second valve such that the emptying of air from said selector reservoir is interrupted.

2. A pressure control device as claimed in claim 1 wherein said first and second valves comprise life valves spring loaded in their respective closing positions and each disposed on one side of said selector valve piston.

3. A pressure control device as claimed in claim 1 wherein said pre-tensioned spring of said buffer means is disposed on the side of said selector piston connected to the main brake line to act towards said selector piston, one end of said pre-tensioned spring resting against a body portion of said selector valve, a moveable spring plate engagable by another end of said pre-tensioned spring and having a flange, and an annular stop connected to the body of said selector valve and engagable by said spring plate flange to limit the movement of said spring plate in the direction toward said selector piston such that said spring plate is spaced from said selector piston when said valve means is in its middle position.

4. A pressure control device as claimed in claim 1 and further comprising retention valve means connected in series with said second valve for maintaining a predeterminded pressure in said selector reservoir when said second valve is open.

5. A pressure control device as claimed in claim 4 wherein said retention valve means comprises a check valve spring-loaded in its closing direction and opening to the atmosphere from said second valve.

* * * * *